(12) United States Patent
Dyrdahl

(10) Patent No.: US 8,882,063 B2
(45) Date of Patent: Nov. 11, 2014

(54) SNOWMOBILE MECHANIC STAND

(71) Applicant: Brady Dyrdahl, Bagley, MN (US)

(72) Inventor: Brady Dyrdahl, Bagley, MN (US)

(*) Notice: Subject to any disclaimer, the term of this patent is extended or adjusted under 35 U.S.C. 154(b) by 23 days.

(21) Appl. No.: 13/850,612

(22) Filed: Mar. 26, 2013

(65) Prior Publication Data
US 2013/0256474 A1   Oct. 3, 2013

Related U.S. Application Data

(60) Provisional application No. 61/615,998, filed on Mar. 27, 2012.

(51) Int. Cl.
*F16M 11/00* (2006.01)
*B60S 13/00* (2006.01)
*B62M 27/02* (2006.01)

(52) U.S. Cl.
CPC ............ *B60S 13/00* (2013.01); *B62M 27/02* (2013.01)
USPC ........ 248/161; 248/158; 248/688; 248/163.1; 248/122.1; 280/47.131; 280/47.33; 180/180

(58) Field of Classification Search
USPC ............ 248/161, 158, 163.1, 220.21, 220.22, 248/274.1, 304, 309.1, 122.1; 180/180, 180/190; 280/47.131, 47.33
See application file for complete search history.

(56) References Cited

U.S. PATENT DOCUMENTS

| | | | | |
|---|---|---|---|---|
| 4,643,396 A * | 2/1987 | Beals | ............................ | 254/116 |
| 5,873,552 A * | 2/1999 | Skarp | ............................ | 248/161 |
| 6,102,369 A * | 8/2000 | Monger | ........................ | 254/8 R |
| 6,971,465 B1 * | 12/2005 | Veara | ............................ | 180/190 |

* cited by examiner

Primary Examiner — Todd M Epps
(74) Attorney, Agent, or Firm — Geiser Law, PLLC; Greg N. Geiser

(57) ABSTRACT

A snowmobile maintenance device including a pair of stands to secure the rear and middle portion of a snowmobile allowing a snowmobile to be tipped onto its edge for repair. The device includes a first stand and second stand. The first stand securely attaches to the snowmobile bumper and extends a length perpendicular to the length of the snowmobile. A second stand is attached to the steering post of the snowmobile parallel to and oriented to the first stand. The stands are adjustable in length and include a base allowing the snowmobile to be easily tipped onto its side and supported by the stands and its existing skis.

9 Claims, 2 Drawing Sheets

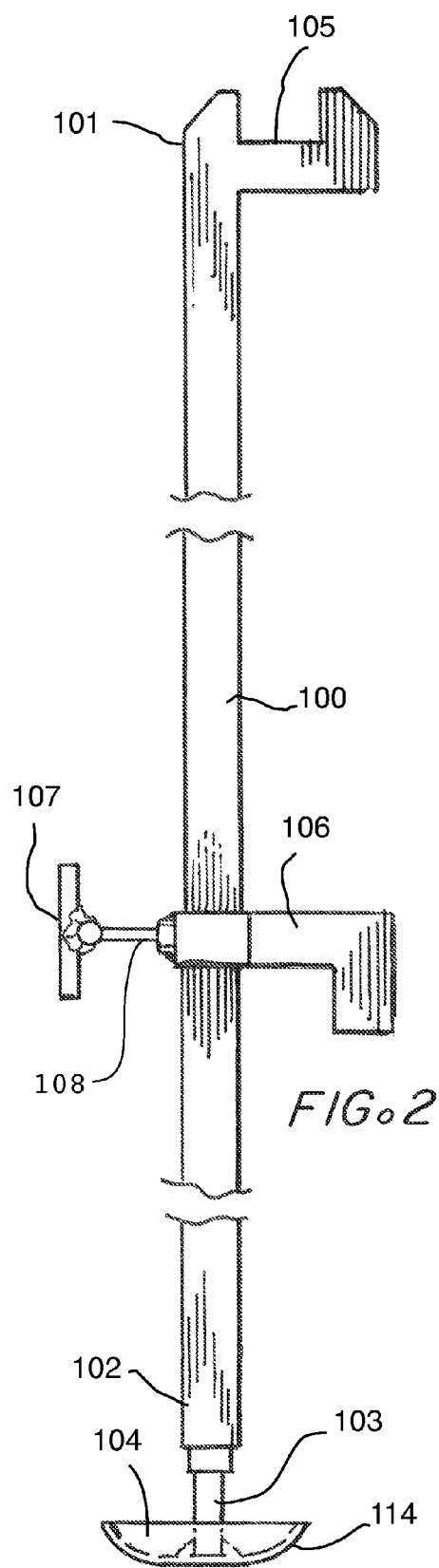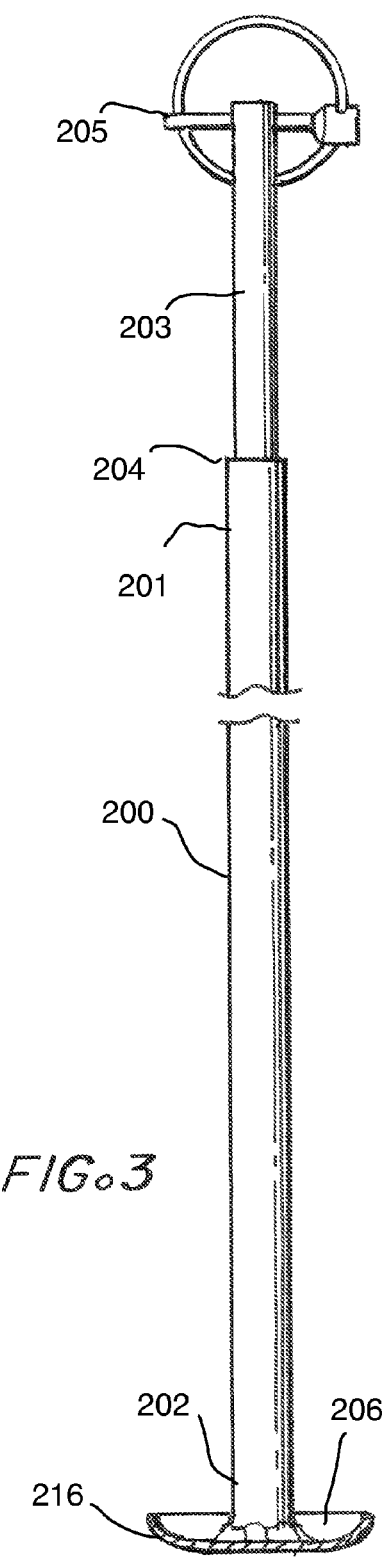

SNOWMOBILE MECHANIC STAND

CROSS REFERENCE TO RELATED APPLICATIONS

This application claims the benefit of provisional patent application Ser. No. 61/615,998 filed 2012 Mar. 27 by the present inventors.

FEDERALLY SPONSORED RESEARCH

Not Applicable

SEQUENCE LISTING OR PROGRAM

Not Applicable

FIELD OF THE INVENTION

The present invention relates to a pair of mechanic stands designed to support a snowmobile in a stable position on its side for repair and maintenance.

BACKGROUND OF THE INVENTION

A snowmobile is a recreational vehicle designed for use on snow or ice. The basic components of a snowmobile or snowmachine or sled, as it is sometimes called, are an engine, a moveable track, and a pair of skis. A user will manipulate the skis using a steering mechanism to orient the snowmobile in the desired direction. The engine powers the track and is typically controlled by a hand operated throttle.

As with all mechanical devices, the operation and ownership of a snowmobile requires routine maintenance and repair. Currently, to repair the underside of a snowmobile, including the track, suspension, studs mounted onto the track, and other accessible and repairable components on the underside of the snowmobile, the snowmobile is lifted vertically. The two common methods of lifting are through the use of a hydraulic jack or using a winch, pulley, and rope attached to the bumper.

Although these devices allow a user to perform maintenance on their snowmobile, they do have several drawbacks. First, to perform maintenance a user is required to work underneath the device with the weight of the device suspended above them. Second, lighting may be a challenge as the overhead position of the snowmobile prevents overhead and natural light from reaching the view of the user. Third, these devices require a significant amount of set up time and space to ensure they operate safely and appropriately. Therefore, there is a need for a device that is easier to use, prevents a user from having to work from underneath the snowmobile, and allows for more access to artificial and natural light on the work surface.

SUMMARY OF THE INVENTION

The present invention provides an improved snowmobile maintenance support device that quickly and safely supports a snowmobile for maintenance and repair. This system utilizes the existing skis of the snowmobile and contains a pair of stands that securely attach to a snowmobile and support the snowmobile on its edge with the track oriented perpendicular to the floor, easily allowing a user to work on the underside of the snowmobile. Each stand has its own features and attaches to a different part of the snowmobile.

A first stand attaches to the bumper and extends a length perpendicular to the length of the snowmobile to support the rear of the snowmobile. The first stand has a top end and a bottom end. The bottom end includes a means to adjust the height of the first stand and a base connected to the height adjustment means. The base creates a stable and solid surface to support the snowmobile and includes an edge. The edge is arcuate shaped to allow the snowmobile to be easily tipped onto and off of its side.

The first top end includes a notch to securely engage the edge of the bumper of the snowmobile. A moveable support is adjustable along the length of the first stand to engage the second edge of the bumper opposite the notch. The moveable support is designed to secure to the stand using friction, pressure, or a mechanical screw that securely engages the stand. The moveable support may include a handle and a securing means to secure the support at a desired position after it is engaged with the bumper.

A second stand attaches to the steering post of the snowmobile parallel to and orientated to the first stand to provide support for the middle of the snowmobile. The second stand has a top end and a bottom end. The top end includes an attachment portion, a lip, and a retaining pin. The bottom end includes a base to support the weight of the snowmobile. The base includes an edge. The edge is arcuate shaped to allow the snowmobile to be easily tipped onto and off of its side.

The attachment portion is narrowed in diameter relative to the second stand to allow for insertion into the steering post of the snowmobile. The lip represents a transition from the narrow end and supports and prevents the steering post from sliding down the second stand when the snowmobile is tipped onto its edge for maintenance. The retaining pin is affixed to the top end of the second stand to ensure the stand is secured within the steering post.

The second stand may include a bracket attachable to the top end to secure a snowmobile that does not have a hollow steering post to allow for insertion of the attachment portion. Preferably, this bracket is removably connected to the attachment end and secures to the handlebars of the snowmobile. This bracket increases the versatility of the device and allows it to be particularly useful for the repair of older snowmobiles.

The height adjustment means allows the user to extend the length of the first stand to accommodate varying widths of the rear end and bumper configurations of a given snowmobile relative to the height of the second stand. Adjustability is necessary to ensure that the system is universal across a wide range of makes, models, and years of snowmobiles. Adjustability is also necessary to allow a user to safely use the device in creating a stable and level working surface; therefore, the first stand and second stand bases and the snowmobile skis are required to be aligned for proper use of the device.

In the preferred embodiment, the height adjustment means is a threaded rod connected to the base and received within the stand. This rod can then easily be moved by twisting the base. Although a threaded rod is preferred due to its ease of use and strength, other similar adjustment means such as a second rod telescopically received within the first rod and secured using a pin, a detent received within a hole, a sliding and latching mechanism, or other similar mechanical stop may be used.

In the preferred embodiment of the present invention, the first stand and second stand are constructed out of steel due to its strength and overall material properties. Although steel is preferred, other metals may be used. The length of the first stand and second stand, measured from the base to the top end, is critical to allow for the device to be universally applicable to several different types, models, manufacturers, and styles of snowmobiles. Based upon experimentation and measurements, the preferred length of the first stand and the second stand from the base to top end is a range between twenty-four inches (24") and thirty-four inches (34"). Although this is the preferred range, the device can be utilized in several additional lengths, with the only limitation the height of the snowmobile with the ski on its edge.

In use, a user will affix the first stand and the second stand to the snowmobile requiring maintenance. The user will make all of the necessary adjustments to secure the stands to the snowmobile and ensure they are properly aligned. This may require the user to adjust the length of the stands by lowering the base and moving the moveable support of the first stand to secure the rear portion of the snowmobile. After the stands are affixed to the device, the user will tip the snowmobile onto its side where the snowmobile will be supported by the bases and the ski of the snowmobile. The user is then able to easily work on the underside of the snowmobile. After work is completed, the user simply rocks the snowmobile back to its normal position and removes the stands.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 2 is a side view of the first stand of device, according to the present invention;

FIG. 3 is a side view of the second stand of the device, according to the present invention.

DETAILED DESCRIPTION OF THE INVENTION

Figure 1:
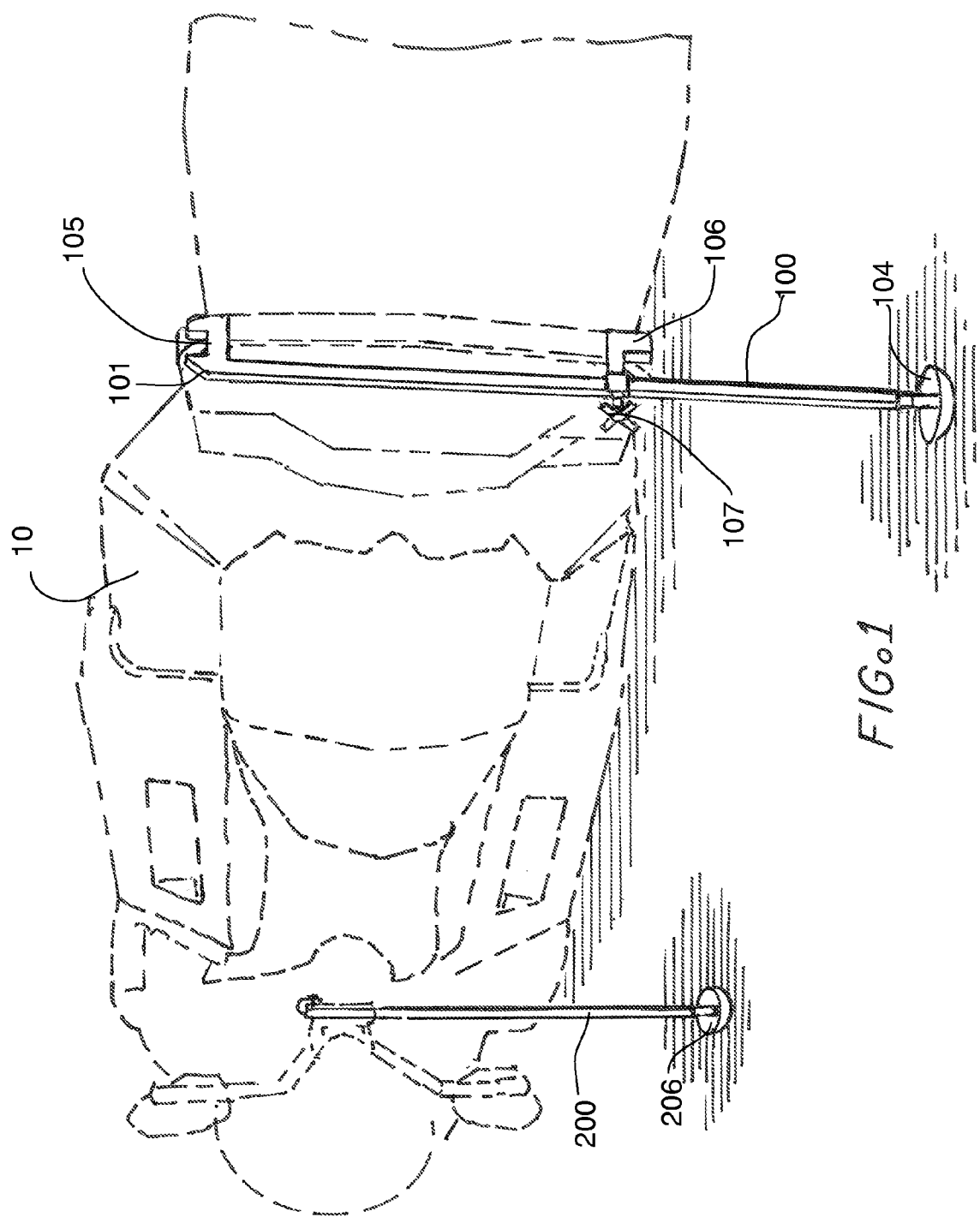
FIG. 1 is a perspective view of device in use, according to the present invention.

Referring now to FIGS. 1-3 of the snowmobile maintenance support device according to the present invention, there is shown a snowmobile 10. The snowmobile 10 includes a track portion, a bumper, a steering post, and a pair of skis and is supported on an edge by a first stand 100 a second stand 200 and one of the skis of the snowmobile 10. In this position, the snowmobile 10 underside is easily accessible to the user allowing the snowmobile 10 to be repaired. The device quickly and safely supports the snowmobile 10 for maintenance and repair. This device utilizes the existing skis of the snowmobile 10 and the pair of stands 100, 200 to support the snowmobile 10 on an edge with the track oriented perpendicular to a floor, easily allowing a user to work on the underside of the snowmobile. Each stand 100, 200 has its own features and attaches to a different part of the snowmobile 10.

The first stand 100 attaches to the bumper of the snowmobile 10 and extends a length perpendicular to the length of the snowmobile 10 to support a rear portion of the snowmobile 10. The first stand 100 has a top end 101 and a bottom end 102. The bottom end 102 includes a means 103 to adjust the height of the first stand 100 and a base 104 connected to the height adjustment means 103. The base 104 creates stable and solid surface to support the snowmobile 10 and includes an edge 114. The edge 114 is arcuate shaped to allow the snowmobile 10 to be easily tipped onto and off of its side.

The first top end 101 includes a notch 105 to securely engage the edge of the bumper of the snowmobile 10. A moveable support 106 is adjustable along the length of the first stand 100 to engage the an opposite edge of the bumper opposite the notch 105. The moveable support 106 is designed to secure to the stand using friction, pressure, or a mechanical screw that securely engages the stand 100. As shown in FIG. 2, the moveable support 106 may include a handle 107 and screw 108 to secure the moveable support 106 at the desired position for engagement with the bumper.

A second stand 200 attaches to the steering post of the snowmobile 10 parallel and orientated to the first stand 100 to provide support for the a middle portion of the snowmobile 10. The second stand 200 has a top end 201 and a bottom end 202. The top end 201 includes an attachment portion 203, a lip 204, and a retaining pin 205. The bottom end 202 includes a base 206 to support the weight of the snowmobile 10. The base 206 includes an edge 216. The edge 216 is arcuate shaped to allow the snowmobile 10 to be easily tipped onto and off of its side.

The top end 201 of the second stand 200 includes the attachment portion 203. The attachment portion 203 is narrowed in diameter relative to the second stand 200 to allow for insertion into the steering post of the snowmobile 10. The lip 204 represents a transition from the narrow attachment portion 203 and supports and prevents the steering post from sliding down the second stand 200 when the snowmobile 10 is tipped onto its edge for maintenance. The retaining pin 205 is affixed to the top end 201 of the second stand 200 to ensure the second stand 200 is secured within the steering post.

The second stand 200 may include a bracket (not pictured) attachable to the top end 201 to secure a snowmobile that does not have a hollow steering post that allows for the insertion of the attachment portion 203. Preferably, this bracket is removably connected to the attachment end and secures the to the handlebars of the snowmobile 10. This bracket increases the versatility of the device and allows it to be particularly useful for the repair of older snowmobiles.

The height adjustment means 103 allows the user to extend the length of the first stand 100 to accommodate varying widths of the rear end and bumper configurations of a given snowmobile 10 relative to the height of the second stand 10. Adjustability is necessary to ensure that the system is universal across a wide range of makes, models, and years of snowmobiles. Adjustability is also necessary to allow a user to safely use the device in creating a stable and level working surface; therefore the first stand 100 and second stand 200 bases 104, 206 and the snowmobile 10 skis are required to be aligned for proper use of the device. Although not pictured, the second stand 200 may include a height adjust means similar to the height adjustment means 103 of the first stand 100.

In the preferred embodiment, the height adjustment means 103 is a threaded rod connected to the base 104 and received within the stand 100. This rod can then easily be moved by twisting the base 104. Although a threaded rod is preferred due to its ease of use and strength, other similar adjustment means such as a detent received within a hole, a sliding and latching mechanism, or other similar mechanical stop may be used.

Further, the height adjustment means 103 may include a rod telescopically received within the stand 100 and retained by a pin. In this configuration, the rod is received within a hollow portion of the stand 100 and slideable to various positions altering the length of the stand 100. The stand 100 and rod will have corresponding apertures to receive the pin and secure the rod relative to the stand 100.

In the preferred embodiment of the present invention, the first stand 100 and second stand 200 are constructed out of steel due to its strength and overall material properties. Although steel is preferred, other metals may be used. The length of the first stand 100 and the second stand 200 measured from the base 104, 206 to the top end 101, 201 is critical to allow for the device to be universally applicable to several different types, models, manufacturers, and styles of snowmobiles. Based upon experimentation and measurements, the preferred length of the first stand 100 and the second stand 200 from the base 104, 206 to the top end 101, 201 is a range between twenty-four inches (24") and thirty-four inches (34"). Although this is the preferred range, the device can be utilized in several additional lengths, with the only limitation the height of the snowmobile with the ski on its edge.

In use, a user will affix the first stand 100 and the second stand 200 to the snowmobile 10 requiring maintenance. The user will make all of the necessary adjustments to secure the stands 100, 200 to the snowmobile 10 and ensure they are properly aligned. This may require the user to adjust the length of the stands 100, 200 by lowering the base and moving the moveable support 106 of the first stand 100 to secure the rear portion of the snowmobile 10. After the stands 100 and 200 are affixed to the snowmobile, the user will tip the snowmobile 10 onto its side where the snowmobile will be supported by the bases 104, 206 and the ski of the snowmobile 10. The user is then able to easily work on the underside of the snowmobile 10. After work is completed, the user simply rocks the snowmobile 10 back to its normal position and removes the stands 100, 200.

In an alternate embodiment of the present invention, the first stand 100 includes a pair of movable supports 106. The movable supports 106 form the notch 105 to secure the stand to the bumper of the snowmobile. In this configuration, one movable support 106 faces upward to secure a side of the bumper rail and a second movable support 106 faces downward to secure the opposed side of the bumper rail. This configuration allows for an easier adjustment to the height of the device, allowing the user to adjust the height of an engaged snowmobile 10 by moving the movable support 106 along the length of the first stand 100.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

What is claimed is:

1. A device for removable attachment to a snowmobile, the device in combination with a ski of the snowmobile for supporting the snowmobile on a side of the snowmobile for repair and maintenance, the device comprising:
    a first stand, the first stand having a top end, a bottom end, and an adjustable height, the first stand secured to a rear bumper edge of the snowmobile using a movable support, the bottom end having a base;
    the moveable support, the moveable support capable of moving along a length of the first stand, the moveable support shaped to engage the rear bumper edge, the movable support secured to the first stand; and
    a second stand, the second stand having a top end and a bottom end, the top end having an attachment portion, a lip, and a pin, the attachment portion sized for receipt in a steering post of the snowmobile, the lip supporting the post when the second stand is received within the steering post, the pin securing the second stand within the steering post, the bottom end having a base, wherein the first stand is attached to the bumper of the snowmobile, the second stand is secured to the steering post of the snowmobile, and the snowmobile is tipped onto an edge and supported by the stands to provide access to an underside of the snowmobile.

2. A device as in claim 1, wherein the first stand base and second stand base have an edge, the edge arcuate shaped.

3. A device as in claim 1, wherein the first stand top end includes a notch, the notch sized to receive the edge of the rear bumper.

4. The device as in claim 1, wherein the first stand and second stand have a length between twenty-four and thirty-four inches.

5. The device as in claim 1, wherein the first stand and second stand are composed of steel.

6. A device for removable attachment to a snowmobile, the device in combination with a ski of the snowmobile for supporting the snowmobile on a side of the snowmobile for repair and maintenance, the device comprising:
    a first stand, the first stand having a top end, a bottom end, and an adjustable height, the top end having a notch, the notch shaped to engage a rear bumper edge of the snowmobile, the bottom end having a base, the base having an edge, the edge arcuate shaped;
    a moveable support, the moveable support capable of moving along a length of the first stand, the moveable support shaped to engage the rear bumper edge opposite the notch, the movable support secured to the first stand; and
    a second stand, the second stand having a top end and a bottom end, the top end having an attachment portion, a lip, and a pin, the attachment portion sized for receipt in a steering post of the snowmobile, the lip supporting the post when the second stand is received within the steering post, the pin securing the second stand within the steering post, the bottom end having a base, the base having an edge, the edge arcuate shaped, wherein the first stand is attached to the bumper of the snowmobile, the second stand is secured to the steering post of the snowmobile, and the snowmobile is tipped onto an edge and supported by the stands to provide access to an underside of the snowmobile.

7. The device as in claim 6, wherein the first stand and second stand have a length between twenty-four and thirty-four inches.

8. The device as in claim 6, wherein the first stand and second stand are composed of steel.

9. A method of using a device for a repair of a snowmobile, the device including a pair of stands, the first stand attached to a rear bumper of the snowmobile, and the second stand attached to a steering post of the snowmobile, the method comprising:
    attaching the first stand to the rear bumper of the snowmobile;
    attaching the second stand to the steering post of the snowmobile parallel and in alignment with the first stand; and
    tipping the snowmobile onto its side, wherein the snowmobile rests on a ski of the snowmobile, the first stand, and the second stand.

* * * * *